United States Patent
Matsuura

(10) Patent No.: US 10,422,624 B2
(45) Date of Patent: Sep. 24, 2019

(54) OPTICAL SYSTEM, OPTICAL DEVICE, AND PROGRAM

(71) Applicant: MITUTOYO CORPORATION, Kanagawa (JP)

(72) Inventor: Shimpei Matsuura, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/049,130

(22) Filed: Jul. 30, 2018

(65) Prior Publication Data
US 2019/0041187 A1    Feb. 7, 2019

(30) Foreign Application Priority Data

Aug. 4, 2017  (JP) .................. 2017-151864

(51) Int. Cl.
G01B 9/02    (2006.01)
G01B 11/24   (2006.01)
G02B 27/28   (2006.01)

(52) U.S. Cl.
CPC ...... *G01B 9/02072* (2013.04); *G01B 9/02011* (2013.01); *G01B 9/02083* (2013.01); *G01B 11/2441* (2013.01); *G02B 27/283* (2013.01); *G01B 2290/70* (2013.01)

(58) Field of Classification Search
CPC ............ G01B 9/02011; G01B 9/02071; G01B 9/02083
See application file for complete search history.

(56) References Cited

U.S. PATENT DOCUMENTS

| | | | |
|---|---|---|---|
| 6,717,680 B1* | 4/2004 | Kuchel | G01B 11/2441 356/514 |
| 8,953,170 B2 | 2/2015 | Usami et al. | |
| 9,115,973 B2 | 8/2015 | Suzuki et al. | |
| 9,618,321 B2 | 4/2017 | Motohashi et al. | |
| 9,644,941 B2 | 5/2017 | Suzuki et al. | |
| 10,088,291 B2 | 10/2018 | Kawasaki et al. | |
| 2010/0134801 A1* | 6/2010 | Millerd | G01B 9/02045 356/492 |

(Continued)

FOREIGN PATENT DOCUMENTS

JP    H09-21606 A    1/1997

*Primary Examiner* — Jonathan M Hansen
(74) *Attorney, Agent, or Firm* — Greenblum & Bernstein, P.L.C.

(57) ABSTRACT

An optical system includes a polarized light phase shift optical circuit that includes a polarizing beam splitter that splits light having a coherence length shorter than a difference in optical path length between a normal optical path and a delay optical path having an optical path length longer than the normal optical path, the light being split into normal light, which travels along the normal optical path, and delay light, which travels along the delay optical path; a separator where the normal light and the delay light are individually emitted at a reference flat and the separator divides the reflected light that reflects off the reference flat into a plurality of light beams; and a plurality of image capture elements that respectively detect the intensities of the plurality of divided light beams, and the optical system also includes an information processor that includes a calibrator.

6 Claims, 7 Drawing Sheets

(56) References Cited

U.S. PATENT DOCUMENTS

2010/0309476 A1* 12/2010 Millerd .............. G01B 11/2441
356/495
2014/0362383 A1 12/2014 Haitjema et al.
2016/0131474 A1 5/2016 Saeki et al.
2017/0016711 A1* 1/2017 Kawasaki ............ G01B 9/0201
2018/0128593 A1* 5/2018 Kawasaki ............ G01B 9/0201

* cited by examiner

Fig. 2A
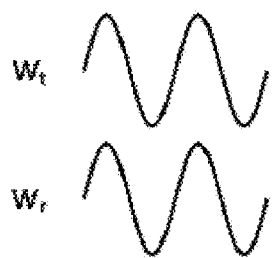
Fig. 2B
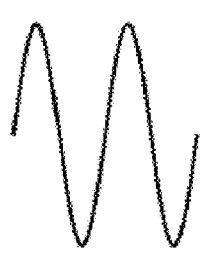
Fig. 2C
Fig. 2D
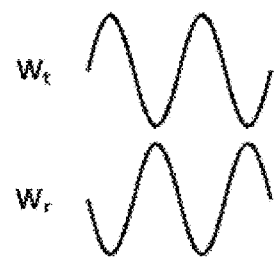
Fig. 2E
Fig. 2F
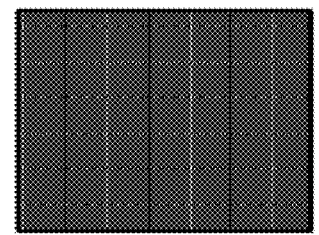
Fig. 2G
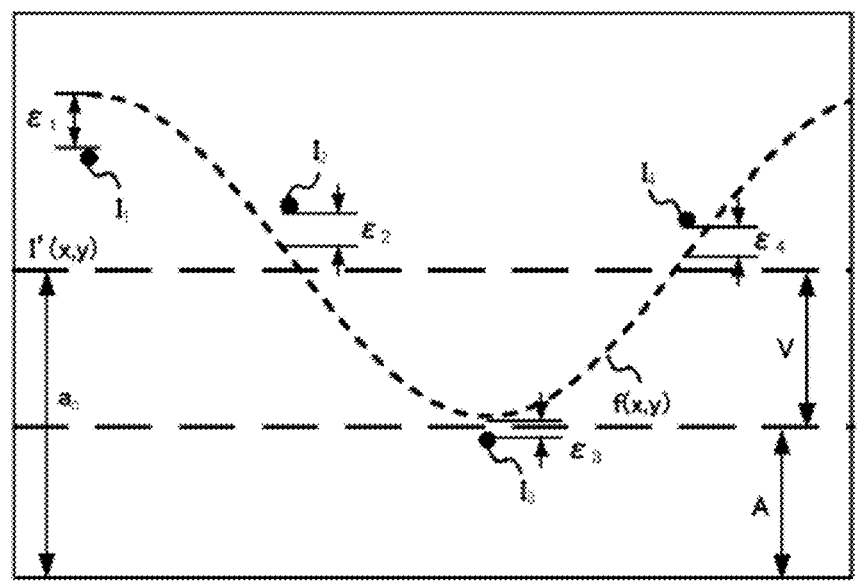

OPTICAL SYSTEM, OPTICAL DEVICE, AND PROGRAM

CROSS-REFERENCE TO RELATED APPLICATIONS

The present application claims priority under 35 U.S.C. § 119 of Japanese Application No. 2017-151864, filed on Aug. 4, 2017, the disclosure of which is expressly incorporated by reference herein in its entirety.

BACKGROUND OF THE INVENTION

1. Field of the Invention

The present invention relates to an optical system, optical device, and program measuring a shape of a measured object.

2. Description of Related Art

A Fizeau type interferometer is known as an example of a device that observes, for example, a surface shape of an optical component, the interferometer being configured such that light from a light source is converted to parallel light; the parallel light is emitted at a reference plate and, in addition, parallel light that passes through the reference plate bombards a test object that is parallel to and a predetermined distance away from the reference plate; and two beams of reflected light from the parallel light reflecting off a reference surface of the reference plate and a test surface of the test object are leveraged to create interference fringes having equal thicknesses (Japanese Patent Laid-open Publication No. H9-21606).

Measurement results of the interferometer are known to be influenced by errors arising from outside factors such as fluctuation in the air or vibration, variations in manufacturing of the various structural elements of the interferometer, or variations during assembly.

SUMMARY OF THE INVENTION

In view of these circumstances, the present invention provides a technology that reduces the influence of errors.

An optical system according to one aspect of the present invention is an optical system provided with a polarized light phase shift optical circuit and an information processing device processing data detected by the polarized light phase shift optical circuit. The polarized light phase shift optical circuit includes a polarizing beam splitter that splits light having a coherence length shorter than a difference in optical path length between a normal optical path and a delay optical path having an optical path length longer than the normal optical path, the light being split into normal light, which travels along the normal optical path, and delay light, which travels along the delay optical path; a separator where the normal light and the delay light are individually emitted at a reference flat and the separator divides the reflected light that reflects off the reference flat into a plurality of light beams; and a plurality of image capture elements that respectively detect the intensities of the plurality of divided light beams. The information processing device includes a calibrator that individually identifies calibration parameters calibrating optical characteristics of the plurality of reflected light beams divided by the separator, the calibrator identifying the calibration parameters based on the intensity of normal reflected light that travels along the normal optical path and reflects off the reference flat, and on the intensity of delay reflected light that travels along the delay optical path and reflects off the reference flat, the normal reflected light and the delay reflected light being respectively detected by the plurality of image capture elements.

The plurality of image capture elements may also detect interfering light for measurement light that travels along the normal optical path and reflects off a measured object and reference light that travels along the delay optical path and reflects off the reference flat. The calibrator may also identify, for each of the plurality of image capture elements, a phase value that corresponds to each of the plurality of image capture elements using a plurality of beams of interfering light received by the plurality of image capture elements and having a phase difference that has been altered by modifying the length of the delay optical path.

The information processing device may further include a measurer that measures a shape of the measured object using the intensity of the interfering light detected by the image capture elements and the calibration parameters and phase value identified by the calibrator.

For example, the polarized light phase shift optical circuit may include at least four of the image capture elements and the measurer may calculate modeling parameters of an approximation function using the least square method, the modeling parameters using the calibration parameters to model a data array that contains the intensities of the interfering light for the measurement light and the reference light.

An optical device according to another aspect of the present invention includes an acquirer that individually acquires the intensities of a plurality of divided light beams where light that is split into normal light, which travels along a normal optical path, and delay light, which travels along a delay optical path that has a longer optical path length than the normal optical path, is individually emitted at a reference flat and the reflected light that reflects off the reference flat is divided into the plurality of light beams; and a calibrator that individually identifies calibration parameters calibrating optical characteristics of the plurality of divided light beams based on the intensity of normal reflected light that travels along the normal optical path and reflects off the reference flat, and on the intensity of delay reflected light that travels along the delay optical path and reflects off the reference flat.

A program according to another aspect of the present invention causes a computer to perform acquisition that individually acquires the intensities of a plurality of divided light beams where light that is split into normal light, which travels along a normal optical path, and delay light, which travels along a delay optical path that has a longer optical path length than the normal optical path, is individually emitted at a reference flat and the reflected light that reflects off the reference flat is divided into the plurality of light beams; and identification that individually identifies calibration parameters calibrating optical characteristics of the plurality of divided light beams based on the intensity of normal reflected light that travels along the normal optical path and reflects off the reference flat, and on the intensity of delay reflected light that travels along the delay optical path and reflects off the reference flat.

According to the present invention, the influence of errors can be reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 2A to 2G illustrate interference and measurement data for two beams of reflected light;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Embodiment

Prerequisite Art for the Embodiment

Figure 1:
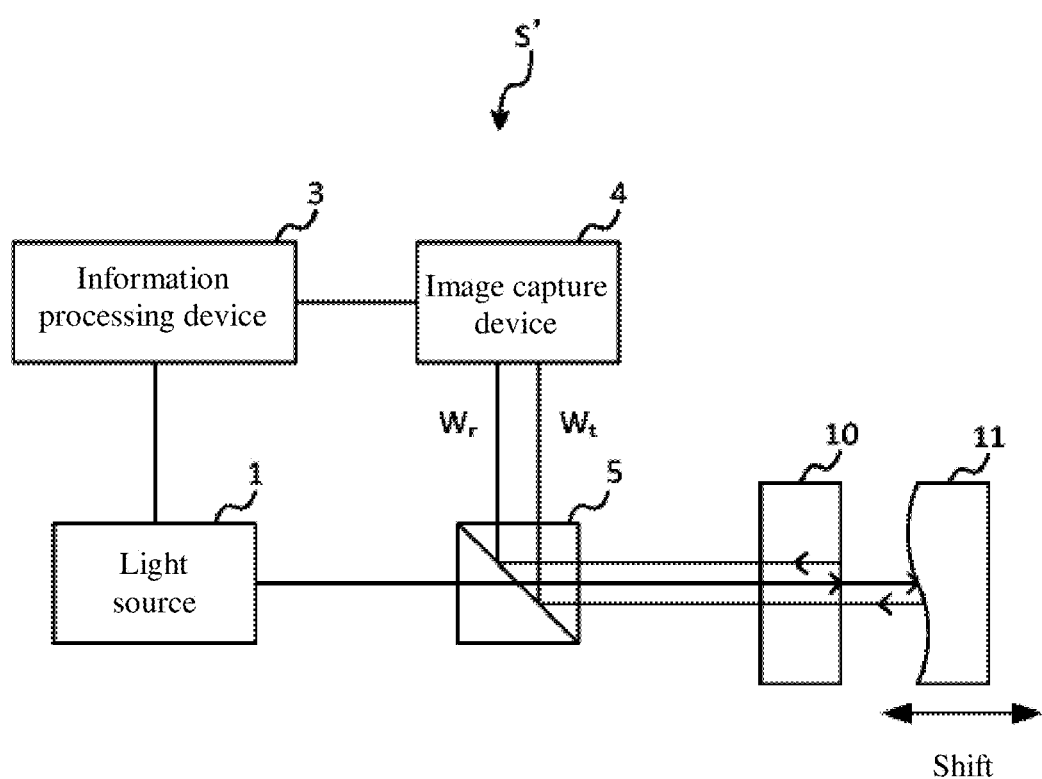
FIG. 1 provides an overview of an optical system.

An optical system S' which employs a Fizeau-type interferometer is described with reference to FIG. 1. FIG. 1 provides an overview of the optical system S'. The optical system S' includes a light source 1, an information processing device (information processor) 3, an image capture device 4, and a beam splitter 5. The information processing device 3 is connected to each of the light source 1 and the image capture device 4 so as to be capable of communication with each. The information processing device 3 can displace a measured object 11 as appropriate. The information processing device 3 may also displace a reference flat 10 instead of displacing the measured object 11.

The light source 1 may, for example, be a laser oscillator that transmits a laser of a predetermined wavelength based on an instruction from the information processing device 3. The laser transmitted by the light source 1 passes through the beam splitter 5 and travels toward the reference flat 10 and the measured object 11. Reflected light reflecting off surfaces of the reference flat 10 and the measured object 11 travels through the beam splitter 5 and toward the image capture device 4. In FIG. 1, Wr indicates reference light, which is the reflected light reflected off the surface of the reference flat 10, while Wt indicates measurement light, which is the reflected light reflected off the surface of the measured object 11.

The image capture device 4 detects the intensity of the received light and thereby generates measurement data. The information processing device 3 shifts the measured object 11 by a displacement distance determined according to the wavelength of the laser light. In this way, the information processing device 3 can change the phase difference between the two beams of reflected light. The information processing device 3 controls the image capture device 4 and generates measurement data each time the measured object 11 is displaced. In this way, the information processing device 3 can acquire measurement data (the intensity of interfering light for the two beams of reflected light) in states where the two beams of reflected light have different phase differences.

The interfering light for the reference light reflected off the surface of the reference flat 10 and the measurement light reflected off the surface of the measured object 11, as well as the measurement data acquired by the image capture device 4, are described with reference to FIGS. 2A to 2G. FIGS. 2A to 2G illustrate interfering light and measurement data for the two beams of reflected light. As in FIG. 1, Wr indicates the reference light and Wt indicates the measurement light in FIGS. 2A to 2G.

FIG. 2A is a schematic view illustrating a case where the phases of the two beams of reflected light substantially match. FIG. 2B is a schematic view illustrating that the two beams of reflected light interfere and the amplitudes of the two beams intensify each other, producing a larger amplitude. FIG. 2C is a schematic view of the measurement data expressed as a measurement image, for the measurement data acquired when the phases of the two beams of reflected light substantially match. As illustrated in FIG. 2C, the measurement image acquired when the phases of the two beams of reflected light substantially match creates an image with a strong light intensity (brightness) across the entire image.

FIG. 2D is a schematic view illustrating a case where the phases of the two beams of reflected light are offset by approximately it (rad). FIG. 2E is a schematic view illustrating that the two beams of reflected light interfere and the amplitudes of the two beams dampen each other, producing a smaller amplitude. FIG. 2F is a schematic view of the measurement data expressed as a measurement image, for the measurement data acquired when the phases of the two beams of reflected light are offset by approximately it (rad). As illustrated in FIG. 2F, the measurement image acquired when the phases of the two beams of reflected light are offset by approximately it (rad) creates an image with a weak light intensity (darkness) across the entire measurement image.

In this example, when the height of the measured object 11 is constant, the phase difference in the interfering light incident on each pixel of an image capture element is the same. Therefore, notionally, each pixel of each image capture element in the image capture device 4 respectively captures an identical intensity of interfering light. Meanwhile, when the height of the measured object 11 is not constant, the phase difference in the interfering light incident on each pixel of the image capture element is different. Therefore, each pixel of the image capture element respectively captures a different intensity of interfering light. The information processing device 3 identifies the phase difference in the interfering light incident on each pixel of the image capture element based on the intensity of the interfering light captured by each pixel of the image capture element in the image capture device 4. In addition, the information processing device 3 can identify the height of the measured object 11 based on the identified phase difference.

FIG. 2G is a schematic view in which a data array is plotted in the order that the light intensity detected at each pixel was captured. The horizontal axis of FIG. 2G indicates the phase difference between the two beams of reflected light that arises from displacing the measured object 11, and the vertical axis indicates the magnitude of the light intensity.

In FIG. 2G, the intensities of the interfering light having different phases, which are detected by certain pixels in the image capture device 4, are each plotted with an individual black circle. Each data item in the plotted data array includes some error from the time of measurement. Therefore, each data item does not necessarily match an approximate value identified based on an approximation function corresponding to the data array. Given this, the difference between each data item and the corresponding approximate value can be used as an error $\varepsilon_i(x, y)$ from the time of measurement, and by identifying modeling parameters that minimize the sum of squares of the error $\varepsilon_i(x, y)$, the approximation function can be fitted to the plotted data array.

A process of the information processing device 3 identifying the modeling parameters is described with reference to FIG. 2G. A function $f(x, y)$ indicated by a dashed line is an approximation function of the data array, in which the intensities of light detected by pixels corresponding to coordinates $(x, y)$ are arranged in the order detected. In FIG. 2G, an amplitude V indicates the amplitude of the approximation function, a bias $I'(x, y)$ indicates a center of oscillation of the approximation function, and an offset A indicates the offset of the approximation function. In addition, the errors $\varepsilon_i$ (i=1 to 4) each indicate a distance from each data item to the corresponding approximate value.

The reference light Wr is represented by expression (1), where the phase of the reference light Wr is expressed as $\phi_r$. The measurement light Wt is represented by expression (2), where the phase of the measurement light Wt is expressed as $\phi_t$, and a phase difference that arises from shifting the measured object 11 is expressed as $\delta_i$. An intensity $I_i$ of the interfering light for the reference light Wr and the measurement light Wt is represented by expression (3). Expression (4) is obtained by expanding expression (3).

[Formula 1]

$$Wr = Ire^{i\phi_r} \quad (1)$$

$$Wt = Ite^{i(\phi_t - \delta_i)} \quad (2)$$

$$I_i = |Wr + Wt|^2 \quad (3)$$

$$I_i = Ir^2 + It^2 + 2IrIt\cos(\phi_t - \phi_r - \delta_i) \quad (4)$$

In this example, in expression (4), $I_r^2 + I_t^2$ is the average intensity of the interfering light, and $2I_rI_t$ is the intensity modulation of the interfering light. In addition, when a difference between the phase defined as $\phi_r$ and the phase defined as $\phi_t$ is defined as a phase difference $\phi$, the phase difference $\phi$ indicates the height of the measured object 11.

Expression (5) is obtained by expanding expression (4).

[Formula 2]

$$I_i = Ir^2 + It^2 + 2IrIt\cos\phi\cos\delta_i - 2IrIt\sin\phi\sin\delta_i \quad (5)$$

Where $\phi = \phi_t - \phi_r$. In this example, each element of expression (5) may be substituted as illustrated in expressions (6) to (8). Expression (5) is represented in expression (9), using expressions (6) to (8).

[Formula 3]

$$a_0 = Ir^2 + It^2 \quad (6)$$

$$a_1 = 2IrIt\cos\phi \quad (7)$$

$$a_2 = 2IrIt\sin\phi \quad (8)$$

$$I_i = a_0 + a_1\cos\delta_i + a_2\sin\delta_i \quad (9)$$

The intensity $I_i$ of the light detected by a given pixel is represented by expression (10) using a matrix, by writing out expression (9) for each $\delta_i$.

[Formula 4]

$$\begin{bmatrix} I_1 \\ I_2 \\ \vdots \\ I_N \end{bmatrix} = \begin{bmatrix} 1 & \cos\delta_1 & \sin\delta_1 \\ 1 & \cos\delta_2 & \sin\delta_2 \\ \vdots & \vdots & \vdots \\ 1 & \cos\delta_N & \sin\delta_N \end{bmatrix} \begin{bmatrix} a_0 \\ a_1 \\ a_2 \end{bmatrix} \quad (10)$$

Expression (10) can be rephrased as I=Xa. At that point, a vector a that is optimal in the sense of minimizing the 2-norm of I−Xa is already known, as a least square solution, and can be written as $a = (X^TX)^{-1}X^TI$. Here, $X^TX$ is represented by expression (11). Also, $X^TI$ is represented by expression (12). In the following expressions, unless noted otherwise, a Σ with no subscript notation is treated as a summation of i=1~N.

[Formula 5]

$$X^TX = \begin{bmatrix} N & \sum\cos\delta_i & \sum\sin\delta_i \\ \sum\cos\delta_i & \sum\cos^2\delta_i & \sum\cos\delta_i\sin\delta_i \\ \sum\sin\delta_i & \sum\cos\delta_i\sin\delta_i & \sum\sin^2\delta_i \end{bmatrix} \quad (11)$$

$$X^TI = \begin{bmatrix} \sum I_i \\ \sum I_i\cos\delta_i \\ \sum I_i\sin\delta_i \end{bmatrix} \quad (12)$$

The information processing device 3 identifies $a_0$ to $a_2$ (modeling parameters) using expressions 11 and 12 above. The information processing device 3 identifies the phase difference $\phi$ using $a_1$ and $a_2$. The phase difference $\phi$ is represented by expression (13). Then, the information processing device 3 identifies a height h, which indicates the shape of the measured object 11, using the phase difference $\phi$ and a wavelength $\lambda$ of the light generated by the light source 1. The height h is represented by expression (14).

[Formula 6]

$$\phi = \arctan\left(\frac{-a_2}{a_1}\right) \quad (13)$$

$$h = \frac{\lambda}{4\pi}\phi \quad (14)$$

Issues in the Prerequisite Art for the Embodiment

In the foregoing description, the information processing device 3 displaces the measured object 11 so as to cause two beams of reflected light to interfere with different phase differences. In this way, when the information processing device 3 modifies the length of an optical path of the reflected light and causes interference with different phase differences, the time at which each beam of interfering light is detected may differ. Therefore, the phase difference in the interfering light captured by the image capture device 4 changes under the influence of atmospheric fluctuations over time. In addition, the background of the interfering light captured by the image capture device 4 changes under the influence of changes in ambient light. The measurement accuracy for the measured object 11 then deteriorates due to the changes in the phase difference and the background of the interfering light captured by the image capture device 4.

In an optical system, reflected light from a reference flat or a measured object is divided, causing the plurality of divided light beams to interfere at respectively different phase differences, and the intensity of the interfering light is detected by each of a plurality of image capture elements. This can reduce the influence of changes in the surrounding environment due to the passage of time. However, in the optical system, when the reflected light is divided, the intensities of each of the plurality of divided light beams is not necessarily identical. This is because an optical circuit is affected by variations in the manufacture of optical elements or variations in the assembly of apparatuses, and therefore a single light beam cannot be divided into equal parts.

An example is considered where the intensities of the light beams detected by the plurality of image capture elements differ: for example, a case where the intensity of a light beam detected by any of the image capture elements is greater than the intensity of a light beam detected by another image capture element. In the least square method, a vector a is calculated that is optimal in the sense of minimizing the 2-norm of I–Xa. Thus, the greater a value's absolute value, the more errors are considered to be incorporated. Therefore, when any image capture element detects a greater light intensity than another image capture element, a result that weights the large light intensity may be calculated by the least square method.

Overview of Optical System According to Embodiment

Figure 3:
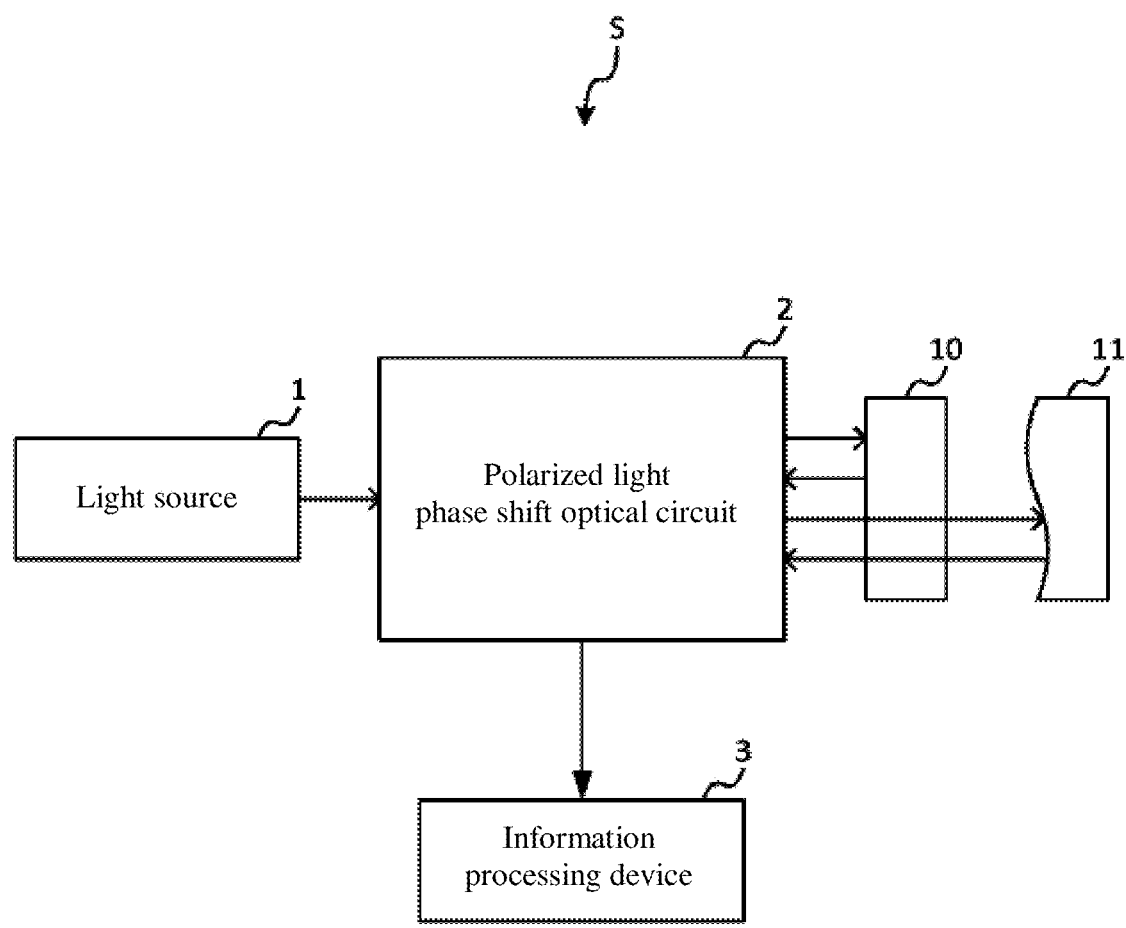
FIG. 3 provides an overview of an optical system according to an embodiment.

In view of the above, an optical system S according to an embodiment of the present invention calibrates modeling parameters that describe the intensities of divided light beams detected by a plurality of image capture elements, the calibration being performed using the intensities of light beams that transit along different paths. By doing this, the optical system S can reduce the influence of errors that are due to variation in the optical system. An overview of the optical system S according to the embodiment is described with reference to FIG. 3. FIG. 3 provides an overview of the optical system S according to the embodiment.

The optical system S includes the light source 1, a polarized light phase shift optical circuit 2, and the information processing device 3 that processes data detected by the polarized light phase shift optical circuit. The information processing device 3 is connected so as to be capable of communication with the light source 1. The information processing device 3 can displace the reference flat 10, the measured object 11, or various structural components of the polarized light phase shift optical circuit 2, as appropriate.

The polarized light phase shift optical circuit 2 includes a normal optical path and a delay optical path that has a longer optical path length than the normal optical path. Light that leaves the light source 1 is divided into two light beams that travel along the two optical paths, respectively. The polarized light phase shift optical circuit 2 emits each of the divided light beams at the same reference flat one at a time. Then, the polarized light phase shift optical circuit 2 divides the light reflected off the reference flat and detects the intensity of each of the divided light beams. The information processing device 3 uses the intensity of each of the divided light beams detected by the polarized light phase shift optical circuit 2 to identify calibration parameters that calibrate the modeling parameters modeling the intensity of the divided light beams.

Various configurations included in the optical system S are described in detail hereafter. The light source 1 is, for example, a super luminescent diode. For example, the light source 1 emits light having a coherence length shorter than a difference in optical path length between the normal optical path and the delay optical path having an optical path length longer than the normal optical path, provided to the polarized light phase shift optical circuit 2. Specifically, the coherence length of the light emitted by the light source 1 is 10 µm.

Figure 4:
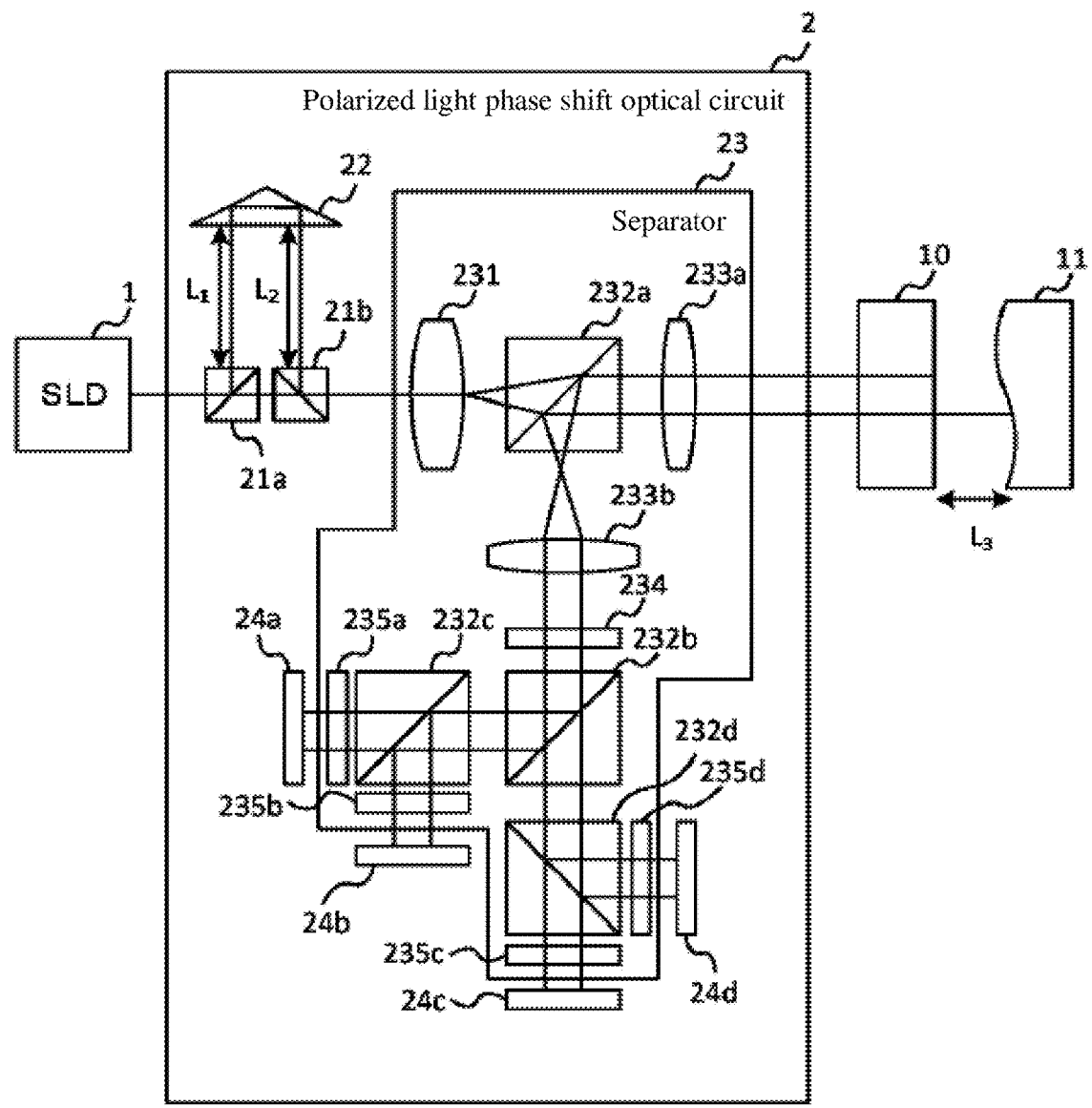
FIG. 4 illustrates a configuration of functions of a polarized light phase shift optical circuit according to the embodiment.

Configuration of Polarized Light Phase Shift Optical Circuit 2 According to Embodiment A configuration of functions of the polarized light phase shift optical circuit 2 according to the embodiment is described with reference to FIG. 4. FIG. 4 illustrates a configuration of functions of the polarized light phase shift optical circuit 2 according to the embodiment. The polarized light phase shift optical circuit 2 includes polarizing beam splitters 21a and 21b, a corner cube 22, a separator 23, and a plurality of image capture elements 24 (24a to 24d). In the present embodiment, the polarized light phase shift optical circuit 2 includes four of the image capture elements 24, but may also include more than four image capture elements 24. Moreover, the polarized light phase shift optical circuit 2 may also include a shielding plate that blocks light and provide the shielding plate between the polarizing beam splitters 21a and 21b, between the polarizing beam splitter 21a and the corner cube 22, or between the corner cube 22 and the polarizing beam splitter 21b.

The polarizing beam splitter 21a splits the light emitted by the light source 1 into normal light that travels along the normal optical path and delay light that travels along the delay optical path. Specifically, of the light emitted by the light source 1, the polarizing beam splitter 21a causes light having an S polarized component to strike the corner cube 22 and causes light having a P polarized component to strike the polarizing beam splitter 21b. The light having the S polarized component and the light having the P polarized component are linearly polarized light beams. The corner cube 22 is a retroreflector that reflects incident light in a direction parallel to and in the opposite orientation from an incidence direction. The corner cube 22 reflects the incident light from the polarizing beam splitter 21a toward the polarizing beam splitter 21b. In the description that follows, an optical path that runs from the polarizing beam splitter 21a through the corner cube 22 to reach the polarizing beam splitter 21b is referred to as the delay optical path, whereas an optical path that runs from the polarizing beam splitter 21a to the polarizing beam splitter 21b without passing through the corner cube 22 is referred to as the normal optical path.

The separator 23 emits normal light and delay light individually at the reference flat 10, and divides the light reflected by the reference flat 10 into a plurality of light beams. The separator 23 divides the reflected light into a plurality of light beams and causes the reflected light to strike the plurality of image capture elements 24. In the following, a specific structure is described in which the separator 23 emits normal light and delay light individually at a reference flat, and divides the light reflected by the reference flat into a plurality of light beams. The separator 23 includes a magnification lens 231, a plurality of beam splitters 232, collimator lenses 233a and 233b, a quarter wave plate 234, and a plurality of polarizing plates 235.

The magnification lens 231 scatters incident light from the polarizing beam splitter 21b and causes the light to strike the image capture element 24a. The beam splitter 232a allows incident light from the separator 23 to pass and strike the collimator lens 233a. In addition, the beam splitter 232a reflects toward the collimator lens 233b the light that has passed through the collimator lens 233a and reflected off the reference flat 10 or the measured object 11. The collimator lens 233a converts incident light from the collimator lens 233a to a parallel light beam and causes the parallel light beam to strike the reference flat 10 and the measured object 11. The collimator lens 233b converts incident light from the beam splitter 232a to a parallel light beam and causes the parallel light beam to strike the quarter wave plate 234.

The quarter wave plate 234 converts the linearly polarized light incident from the collimator lens 233b into circularly polarized light or elliptically polarized light and causes the polarized light to strike the beam splitter 232b. The beam splitter 232b divides the incident light from the quarter wave plate 234 into light incident on a beam splitter 232c and light incident on a beam splitter 232d. The beam splitter 232c divides the incident light from the beam splitter 232b into light incident on a polarizing plate 235a and light incident on a polarizing plate 235b. The beam splitter 232d divides the incident light from the beam splitter 232b into light incident on a polarizing plate 235c and light incident on a polarizing plate 235d.

The polarizing plates 235a to 235d each convert the incident circularly polarized light or elliptically polarized light into linearly polarized light oriented in respectively different directions. When the plurally divided reference light and measurement light pass through the polarizing plates 235a to 235d and are polarized in different directions, the polarized light individually strikes the plurality of image capture elements 24 as interfering light having different phase differences $\delta i$. Specifically, the polarizing plate 235a causes incident light from the beam splitter 232c to strike the image capture element 24a as interfering light having a phase difference of 0 (rad). The polarizing plate 235b causes incident light from the beam splitter 232c to strike the image capture element 24b as interfering light having a phase difference of $\pi/2$ (rad). The polarizing plate 235c causes incident light from the beam splitter 232d to strike the image capture element 24c as interfering light having a phase difference of $\pi$ (rad). The polarizing plate 235d causes incident light from the beam splitter 232d to strike the image capture element 24d as interfering light having a phase difference of $3\pi/2$ (rad).

The image capture elements 24 are, for example, elements that convert received light into an electric signal. Specifically, the image capture elements 24 may be a CCD (Charge Coupled Device) image sensor or a CMOS (Complementary Metal Oxide Semiconductor) image sensor, but the image capture elements 24 are not limited to this. The plurality of image capture elements 24 respectively detect the intensity of a plurality of divided light beams. In addition, the plurality of image capture elements 24 may also detect the intensity of interfering light caused by the interference between the measurement light that travels along the normal optical path and reflects off the measured object and the reference light that travels along the delay optical path and reflects off the reference flat. The image capture elements 24 transmit the detected intensity of the light to the information processing device 3.

In this way, the polarized light phase shift optical circuit 2 can cause the two divided beams of reflected light to strike the plurality of image capture elements 24 as interfering light having different phase differences. Therefore, interfering light having a plurality of different phase differences can be detected instantaneously, as compared to a case where the optical system S' displaces the reference flat 10 or the measured object 11 and thereby detects interfering light having a plurality of different phase differences.

Figure 5:
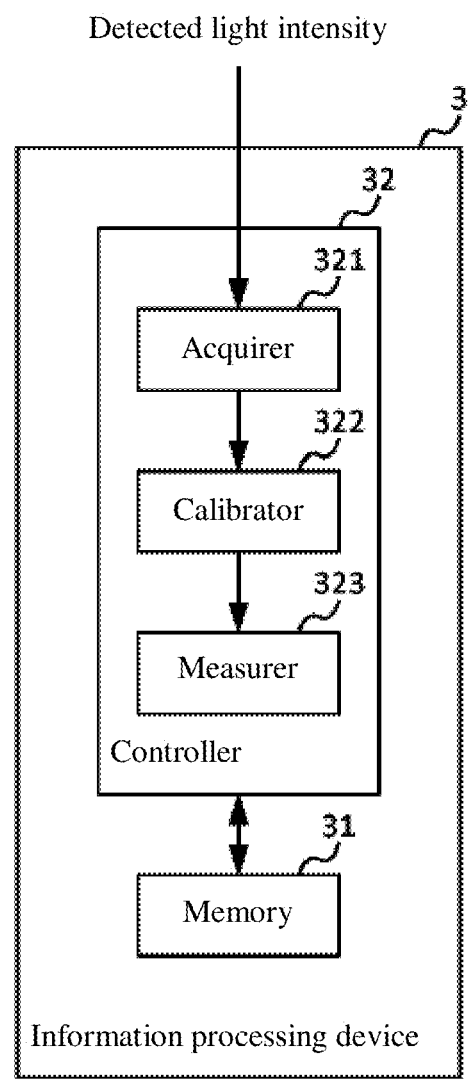
FIG. 5 illustrates a configuration of functions of an information processing device according to the embodiment.

Configuration of Information Processing Device 3 According to Embodiment A configuration of functions of the information processing device 3 according to the embodiment is first described with reference to FIG. 5. FIG. 5 illustrates the configuration of functions of the information processing device 3 according to the embodiment. The information processing device 3 includes a memory 31 and a controller 32. The memory 31 includes a storage medium such as ROM (Read Only Memory) and RAM (Random Access Memory). The memory 31 stores programs executed by the controller 32. The memory 31 may also store the light intensity detected by the image capture elements 24, or calibration parameters.

The controller 32 is a calculation resource that includes a processor such as a CPU (Central Processing Unit) not depicted in the drawings. The controller 32 achieves the functions of an acquirer 321, a calibrator 322, and a measurer 323 by executing a program stored in the memory 31.

The acquirer 321 acquires the intensity of the light detected by the image capture elements 24. Specifically, light that is split into normal light, which travels along the normal optical path, and delay light, which travels along the delay optical path that has a longer optical path length than the normal optical path, is individually emitted at the reference flat 10 and the light that reflects off the reference flat 10 is divided into a plurality of light beams, and the acquirer 321 individually acquires the intensity of the plurality of divided light beams. The acquirer 321 notifies the calibrator 322 of the acquired light intensities.

The calibrator 322 individually identifies calibration parameters that calibrate optical characteristics of the plurality of reflected light beams divided by the separator 23. Specifically, the calibrator 322 identifies the calibration parameters based on the intensity of the normal reflected light that travels along the normal optical path and reflects off the reference flat 10, and on the intensity of the delay reflected light that travels along the delay optical path and reflects off the reference flat 10, the normal reflected light and the delay reflected light being respectively detected by a plurality of image capture elements.

In the optical system S' according to the prerequisite technology, the intensities of a plurality of interfering light beams are detected by the single image capture device 4. In other words, in the optical system S', the element ($I_1$ to $I_N$) on the left side of expression (10) indicate light intensities detected under identical conditions. Meanwhile, in the optical system S according to the embodiment, the reflected light is divided and the intensities of a plurality of interfering light beams are respectively detected by the plurality of image capture elements 24. Therefore, in the optical system S, the elements ($I_1$ to $I_N$) on the left side of expression (10) indicate light intensities detected under different conditions.

The calibration parameters are parameters calibrating, for example, an oscillation center component that indicates the center of oscillation of the approximation function and an amplitude component that indicates the amplitude of the approximation function. In expression (9), the oscillation center component is $a_0$ and the amplitude components are $a_1$ and $a_2$. Specifically, the calibration parameters calibrate the modeling parameters $a_0$, $a_1$, and $a_2$ using a parameter $p^i$ that calibrates the oscillation center component $a_0$ of the approximation function, which approximates the intensity of the light detected by an ith image capture element, and a parameter $q^i$ that calibrates the amplitude component. The calibration parameter $p^i$ is represented by expression (15), and the calibration parameter $q^i$ is represented by expression (16).

[Formula 7]

$$p^i = \frac{C_s^i + C_p^i}{\sum_i (C_s^i C_p^i)} \quad (15)$$

$$q^i = \frac{\sqrt{C_s^i C_p^i}}{\sum_i \sqrt{C_s^i C_p^i}} \quad (16)$$

Here, $C_s$ is the intensity of the delay reflected light and $C_p$ is the intensity of the normal reflected light. Expression (9) is represented in expression (17), using the calibration parameters $p^i$ and $q^i$.

[Formula 8]

$$I_i = p^i a_0 + q^i a_1 \cos \delta_i + q^i a_2 \sin \delta_i \quad (17)$$

In this way, by calibrating the modeling parameters, the calibrator 322 can make a contribution ratio of each of the plurality of detected light intensities uniform. In addition, expression (18) can be obtained by writing out expression (17) for each item of measurement data.

[Formula 9]

$$\sum_i \begin{bmatrix} \{p_i\}^2 & p^i q^i \cos\delta_i & p^i q^i \sin\delta_i \\ p^i q^i \cos\delta_i & \{q^i \cos\delta_i\}^2 & \{q^i\}^2 \sin\delta_i \cos\delta_i \\ p^i q^i \sin\delta_i & \{q^i\}^2 \sin\delta_i \cos\delta_i & \{q^i \sin\delta_i\}^2 \end{bmatrix} \begin{bmatrix} a_0 \\ a_1 \\ a_2 \end{bmatrix} = \begin{bmatrix} p^i I_i \\ q^i I_i \cos\delta_i \\ q^i I_i \sin\delta_i \end{bmatrix} \quad (18)$$

The calibrator 322 may also identify, for each of the plurality of image capture elements 24, a phase value that corresponds to each of the plurality of image capture elements 24. Hereafter, a process is described that identifies the phase value that corresponds to each of the plurality of image capture elements 24. In the following description, the measured object is a measured object used for calibration, which has a controlled shape.

First, the calibrator 322 of the information processing device 3 determines whether the measured object is installed. When the calibrator 322 determines that the measured object is installed, the calibrator 322 controls various structural components of the polarized light phase shift optical circuit 2 and causes both reference light and measurement light to be emitted at each of the plurality of image capture elements 24. The calibrator 322 also displaces the corner cube 22 of the polarized light phase shift optical circuit 2, the reference flat 10, or the measured object 11 such that the optical path length difference ($L_1 + L_2$) of the normal optical path and the delay optical path is equal to an optical path length ($L_3$) that is two times the distance between the reference flat 10 and the measured object 11.

The calibrator 322 determines whether the plurality of image capture elements 24 have detected interfering light. When the calibrator 322 determines that the plurality of image capture elements 24 have detected interfering light, the calibrator 322 identifies a characteristic phase value $\theta_i$ for each of the plurality of image capture elements 24. A specific method by which the calibrator 322 identifies the phase value $\theta_i$ is similar to the method by which a phase value is identified by the optical system S' using a Fizeau type interferometer, which has already been described, and therefore a description of the method of the calibrator 322 is omitted. The calibrator 322 is not limited to this, and may also identify a phase value using a known method.

The calibrator 322 may also identify a phase difference $\psi_i$ between the plurality of image capture elements 24 using the phase values $\theta_i$ of the plurality of image capture elements 24. For example, the calibrator 322 identifies the phase difference $\psi_i$ using the phase value $\theta_i$ from any one of the plurality of image capture elements 24 as a standard reference. When the first image capture element 24 is used as the reference, the phase difference $\psi_i$ is zero. In this way, the calibrator 322 can correct a phase difference $\delta_i$ that differs among the plurality of image capture elements 24 in a case where the information processing device 3 measures an actual measured object, and therefore measurement accuracy when measuring the measured object can be improved.

The measurer 323 measures the shape of the measured object 11 using the intensity of the interfering light received by the image capture elements 24 and the calibration parameters and phase value identified by the calibrator 322. For example, the measurer 323 calculates the modeling parameters of the approximation function using the least square method, the modeling parameters using the calibration parameters to model a data array that contains the intensities of the interfering light for the measurement light and the reference light. An expression finding the phase difference of each of the image capture elements 24 is defined as the phase difference and finding the modeling parameters ($a_0$, $a_1$, and $a_2$) of the approximation function that are modeled using the calibration parameters is represented by expression (19) below.

[Formula 10]

$$\sum_i \begin{bmatrix} \{p_i\}^2 & p^i q^i \cos(\delta_i + \psi_i) & p^i q^i \sin(\delta_i + \psi_i) \\ p^i q^i \cos(\delta_i + \psi_i) & \{q^i \cos(\delta_i + \psi_i)\}^2 & \{q^i\}^2 \sin(\delta_i + \psi_i)\cos(\delta_i + \psi_i) \\ p^i q^i \sin(\delta_i + \psi_i) & \{q^i\}^2 \sin(\delta_i + \psi_i)\cos(\delta_i + \psi_i) & \{q^i \sin(\delta_i + \psi_i)\}^2 \end{bmatrix} \begin{bmatrix} a_0 \\ a_1 \\ a_2 \end{bmatrix} = \begin{bmatrix} p^i I_i \\ q^i I_i \cos(\delta_i + \psi_i) \\ q^i I_i \sin(\delta_i + \psi_i) \end{bmatrix} \quad (19)$$

The measurer 323 may also identify the height h of the measured object using the calculated modeling parameters. Specifically, the measurer 323 identifies the height h indicating the shape of the measured object using the phase difference $\phi$ defined by the calculated modeling parameters, and a wavelength $\lambda$ of the light source 1. As previously described, the phase difference $\phi$ is represented by expression (13) and the height h is represented by expression (14).

The measurer 323 identifies the height h for each pixel respectively corresponding to the plurality of image capture elements 24. In this way, the measurer 323 can identify the height of the measured object 11 using the modeling parameters calibrated by the calibration parameters, and therefore measurement accuracy can be improved.

Figure 6:
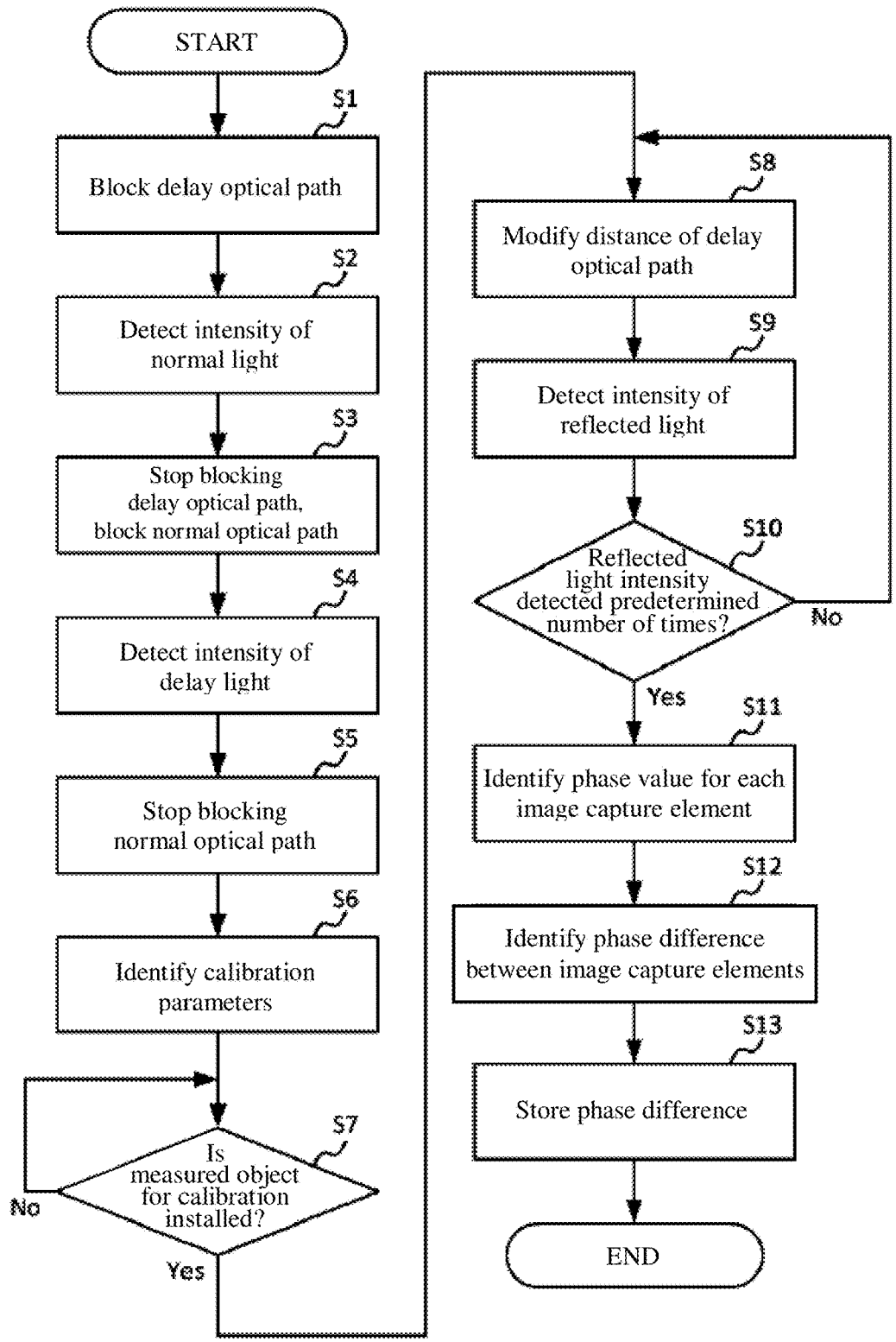
FIG. 6 is a flow chart for a process of calibrating light intensity.

Hereafter, a process of the information processing device 3 calibrating the light intensity is described with reference to FIG. 6. FIG. 6 is a flow chart for the process of calibrating light intensity. First, the calibrator 322 of the information processing device 3 controls the polarized light phase shift optical circuit 2 and blocks the delay optical path (step S1). Next, the calibrator 322 controls the light source 1 and emits light at the polarized light phase shift optical circuit 2. The calibrator 322 controls the polarized light phase shift optical circuit 2 and detects the intensity of the normal light that travels along the normal optical path (step S2). Then, the acquirer 321 acquires the intensity of the normal light detected by the polarized light phase shift optical circuit 2.

When the acquirer 321 acquires the intensity of the light, the calibrator 322 controls the polarized light phase shift optical circuit 2 to stop blocking the delay optical path, and blocks the normal optical path (step S3). The calibrator 322 controls the polarized light phase shift optical circuit 2 and detects the intensity of the delay light that travels along the delay optical path (step S4). Then, the acquirer 321 acquires the intensity of the delay light detected by the polarized light phase shift optical circuit 2. When the acquirer 321 acquires the intensity of the delay light, the calibrator 322 controls the polarized light phase shift optical circuit 2 and stops blocking the normal optical path (step S5).

The calibrator 322 identifies the calibration parameters using the intensity of the normal light and the intensity of the delay light (step S6). Next, the calibrator 322 determines whether the measured object for calibration is installed (step S7). When the calibrator 322 determines that the measured object for calibration is not installed ("No" in step S7), the calibrator 322 stands by until determining that the measured object for calibration is installed. When the calibrator 322 determines that the measured object for calibration is installed ("Yes" in step S7), the process advances to step S8.

The calibrator 322 controls the polarized light phase shift optical circuit 2 and displaces the corner cube 22, thereby modifying the distance of the delay optical path (step S8). When the distance of the delay optical path is modified, the calibrator 322 controls the polarized light phase shift optical circuit 2 and causes the polarized light phase shift optical circuit 2 to detect the intensity of the reflected light that is reflected off the reference flat 10 and the measured object 11 (step S9). The acquirer 321 acquires the detected intensity of the reflected light. The calibrator 322 determines whether the intensity of reflected light beams has been detected a predetermined number of times (step S10). When the calibrator 322 determines that the intensity of the reflected light has not been detected the predetermined number of times ("No" in step S10), the process returns to step S8. The calibrator 322 repeats steps S8 to S10 until determining that the intensity of reflected light beams has been detected the predetermined number of times.

When the calibrator 322 determines that the intensity of reflected light beams has been detected the predetermined number of times ("Yes" in step S10), the calibrator 322 identifies the phase value for each image capture element 24 using the acquired intensity of the reflected light (step S11). When the phase value for each image capture element 24 is identified, the calibrator 322 identifies the phase difference between each image capture element 24 using the identified phase value (step S12). Then, the calibrator 322 stores the identified phase difference in the memory 31 (step S13).

Figure 7:
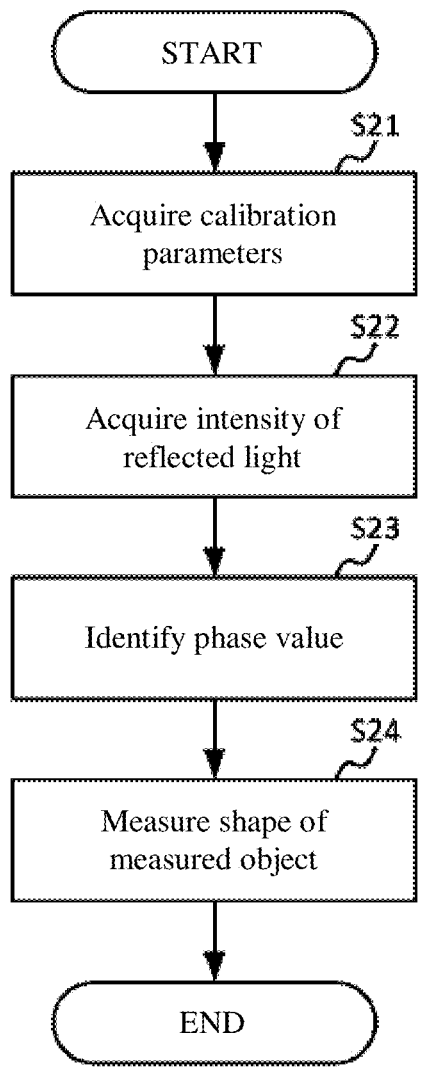
FIG. 7 is a flow chart for a process of measuring a shape of a measured object.

Hereafter, a process of the information processing device 3 measuring the shape of the measured object 11 is described with reference to FIG. 7. FIG. 7 is a flow chart for the process of measuring the shape of the measured object. First, the measurer 323 acquires the calibration parameters from the memory 31 (step S21). The measurer 323 acquires the intensity of the reflected light detected by the image capture elements 24 (step S22). The measurer 323 identifies the phase value (modeling parameter) using the calibration parameters and the intensity of the reflected light (step S23). Then, the measurer 323 measures the shape of the measured object 11 using the phase value (step S24).

Effect of the Embodiment

As described above, the calibrator 322 of the information processing device 3 identifies the calibration parameters that calibrate the modeling parameters, which model the intensity of the plurality of divided light beams. By doing this, the calibrator 322 can calibrate the optical characteristics of the plurality of divided reflected light beams, and therefore can reduce the influence of errors due to variation in the optical system receiving the divided light beams.

The calibrator 322 identifies the phase difference between the plurality of image capture elements 24 by identifying the phase values of the plurality of image capture elements 24 using the calibration parameters. In this way, the calibrator 322 can correct the phase difference $\delta_i$ between the plurality of image capture elements 24 in a case where the information processing device 3 measures an actual measured object, and therefore measurement accuracy when measuring the measured object 11 can be improved.

Furthermore, the measurer 323 measures the shape of the measured object 11 using the phase difference $\delta_i$ between the image capture elements 24, for which the influence of variation in the optical system between the image capture elements 24 is reduced and corrected. In this way, the measurer 323 can reduce the influence of errors, and therefore accuracy in measuring the shape of the measured object 11 can be improved.

The present invention is described above by way of an embodiment, but the technical scope of the present invention is not limited to that described in the embodiment above, and various modifications are possible within the scope of the description. For example, the specific embodiments of separated or integrated devices are not limited to the embodiment given above, and all or a portion thereof can be configured to be functionally or physically separated or integrated in any desired units. In addition, novel embodiments produced by the arbitrary combination of a plurality of embodiments are also included in the scope of the embodiment of the present invention. The benefits of a novel embodiment produced by such combination also include the benefits of the original embodiment of the present invention.

It is noted that the foregoing examples have been provided merely for the purpose of explanation and are in no way to be construed as limiting of the present invention.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical system comprising:
    a polarized light phase shift optical circuit; and
    an information processor that processes data detected by the polarized light phase shift optical circuit, wherein:
    the polarized light phase shift optical circuit comprises:
        a polarizing beam splitter that splits light having a coherence length shorter than a difference in optical path length between a normal optical path and a delay optical path having an optical path length longer than the normal optical path, the light being split into normal light, which travels along the normal optical path, and delay light, which travels along the delay optical path;
        a separator where the normal light and the delay light are individually emitted at a reference flat and the separator divides the reflected light that reflects off the reference flat into a plurality of light beams; and
        a plurality of image capture elements that respectively detect the intensities of the plurality of divided light beams,
    the information processor comprises a processor and a memory that stores an instruction, the information processor further comprising, as a configuration when the processor executes the instruction stored in the memory:
        a calibrator that individually identifies calibration parameters for calibrating optical characteristics of the plurality of reflected light beams divided by the separator, the calibrator further identifying the calibration parameters based on the intensity of normal reflected light that travels along the normal optical path and reflects off the reference flat, and further based on the intensity of delay reflected light that travels along the delay optical path and reflects off the reference flat, the normal reflected light and the delay reflected light being respectively detected by the plurality of image capture elements.

2. The optical system according to claim 1, wherein:
    the plurality of image capture elements detect interfering light for measurement light that travels along the normal optical path and reflects off a measured object and reference light that travels along the delay optical path and reflects off the reference flat, and
    the calibrator identifies, for each of the plurality of image capture elements, a phase value that corresponds to each of the plurality of image capture elements using a plurality of beams of interfering light received by the plurality of image capture elements and having a phase difference that has been altered by modifying the length of the delay optical path.

3. The optical system according to claim 2, wherein the information processor further comprises a measurer that measures a shape of the measured object using the intensity of the interfering light detected by the image capture elements and the calibration parameters and phase value identified by the calibrator.

4. The optical system according to claim 3, wherein:
    the polarized light phase shift optical circuit comprises at least four of the image capture elements, and
    the measurer calculates modeling parameters of an approximation function using the least square method, the modeling parameters using the calibration parameters to model a data array that contains the intensities of the interfering light for the measurement light and the reference light.

5. An optical device comprising:
    a processor and a memory that stores an instruction, the optical device further comprising, as a configuration when the processor executes the instruction stored in the memory:
        an acquirer that individually acquires the intensities of a plurality of divided light beams where light that is split into normal light, which travels along a normal optical path, and delay light, which travels along a delay optical path that has a longer optical path length than the normal optical path, is individually emitted at a reference flat, and the reflected light that reflects off the reference flat is divided into the plurality of light beams; and
        a calibrator that individually identifies calibration parameters for calibrating optical characteristics of the plurality of divided light beams based on the intensity of normal reflected light that travels along the normal optical path and reflects off the reference flat, and further based on the intensity of delay reflected light that travels along the delay optical path and reflects off the reference flat.

6. At least one tangible, non-transitory computer-readable medium storing an executable set of instructions which, when executed by a computer processor, causes the computer processor to execute operations comprising:
    acquisition that individually acquires the intensities of a plurality of divided light beams where light that is split into normal light, which travels along a normal optical path, and delay light, which travels along a delay optical path that has a longer optical path length than the normal optical path, is individually emitted at a reference flat, and the reflected light that reflects off the reference flat is divided into the plurality of light beams; and
    identification that individually identifies calibration parameters calibrating optical characteristics of the plurality of divided light beams based on the intensity of normal reflected light that travels along the normal optical path and reflects off the reference flat, and further based on the intensity of delay reflected light that travels along the delay optical path and reflects off the reference flat.

* * * * *